(12) United States Patent
Bonilla et al.

(10) Patent No.: US 12,502,835 B2
(45) Date of Patent: Dec. 23, 2025

(54) AUTOMATED DE-POWDERING OF ADDITIVE MANUFACTURING BUILD

(71) Applicant: General Electric Company, Schenectady, NY (US)

(72) Inventors: Carlos H. Bonilla, Lebanon, OH (US); Timothy Francis Andrews, Cincinnati, OH (US); Jack Anthony Otte, West Chester, OH (US); Talon Parker, Middletown, OH (US); Tyler Nicodemus, Blue Ash, OH (US)

(73) Assignee: General Electric Company, Evendale, OH (US)

( * ) Notice: Subject to any disclaimer, the term of this patent is extended or adjusted under 35 U.S.C. 154(b) by 54 days.

(21) Appl. No.: 18/426,588

(22) Filed: Jan. 30, 2024

(65) Prior Publication Data

US 2025/0242544 A1 Jul. 31, 2025

(51) Int. Cl.
*B29C 64/35* (2017.01)
*B29C 64/153* (2017.01)
*B33Y 40/20* (2020.01)

(52) U.S. Cl.
CPC ............ *B29C 64/35* (2017.08); *B29C 64/153* (2017.08); *B33Y 40/20* (2020.01)

(58) Field of Classification Search
None
See application file for complete search history.

(56) References Cited

U.S. PATENT DOCUMENTS

| | | | |
|---|---|---|---|
| 6,932,935 B1 | 8/2005 | Oberhofer et al. | |
| 7,828,022 B2 | 11/2010 | Davidson et al. | |
| 7,971,991 B2 | 7/2011 | Davidson et al. | |
| 8,827,681 B2 | 9/2014 | Chen et al. | |
| 9,475,234 B2 | 10/2016 | Morikawa | |
| 9,586,365 B2 | 3/2017 | Chen et al. | |
| 9,821,543 B1 | 11/2017 | Crear et al. | |
| 9,827,754 B2 | 11/2017 | Swartz et al. | |

(Continued)

FOREIGN PATENT DOCUMENTS

| | | |
|---|---|---|
| CN | 112589128 A | 4/2021 |
| CN | 217492697 U | 9/2022 |

(Continued)

OTHER PUBLICATIONS

Extended European Search Report for Application No. 25151701.7 dated Jul. 29, 2025 (8 pages), 8 pages.

*Primary Examiner* — Eric W Golightly

(74) *Attorney, Agent, or Firm* — Dinsmore & Shohl LLP

(57) ABSTRACT

An automated de-powdering system comprises a sleeve alignable with at least a portion of a build chamber and at least one actuator actuatable with respect to a build plate to move at least a portion of an additive manufacturing build out of the build chamber and into the sleeve. At least one support assembly is couplable to the sleeve and includes at least one support member insertable through the sleeve and into the additive manufacturing build. At least one agitation mechanism is couplable to at least one of the at least one support assembly or the sleeve and is actuatable to at least partially convey the powder build material away from at least one object of the additive manufacturing build. The support member is positioned to support the object in an absence of the powder build material around the object.

8 Claims, 11 Drawing Sheets

(56) References Cited

U.S. PATENT DOCUMENTS

| | | |
|---|---|---|
| 10,118,335 B2 | 11/2018 | Yoo et al. |
| 10,178,868 B2 | 1/2019 | Contractor et al. |
| 10,384,437 B2 | 8/2019 | Swartz et al. |
| 10,500,789 B2 | 12/2019 | Fulop et al. |
| 10,543,530 B2 | 1/2020 | Hermann et al. |
| 10,543,643 B2 | 1/2020 | Sachs et al. |
| 10,569,468 B2 | 2/2020 | Koch et al. |
| 10,583,606 B2 | 3/2020 | Joerger et al. |
| 10,596,626 B2 | 3/2020 | DeMuth et al. |
| 10,682,704 B2 | 6/2020 | Swanner, Jr. et al. |
| 10,717,262 B2 | 7/2020 | Hochsmann et al. |
| 10,821,485 B2 | 11/2020 | Barua et al. |
| 10,933,620 B2 | 3/2021 | Sutcliffe et al. |
| 11,123,924 B2 | 9/2021 | McMurtry et al. |
| 11,220,058 B2 | 1/2022 | Monaco et al. |
| 11,331,860 B2 | 5/2022 | Morganson et al. |
| 11,413,790 B2 | 8/2022 | Swartz et al. |
| 11,485,086 B2 | 11/2022 | Krasowski et al. |
| 11,491,720 B2 | 11/2022 | Jordan |
| 11,534,972 B2 | 12/2022 | Skurkis et al. |
| 11,691,342 B2 | 7/2023 | McMurtry et al. |
| 11,718,033 B2 | 8/2023 | Myerberg et al. |
| 2004/0084814 A1 | 5/2004 | Boyd et al. |
| 2015/0314389 A1 | 11/2015 | Yamada |
| 2016/0279871 A1 | 9/2016 | Heugel et al. |
| 2017/0036401 A1 | 2/2017 | Donovan et al. |
| 2017/0120530 A1 | 5/2017 | DeMuth et al. |
| 2018/0021855 A1 | 1/2018 | De Lajudie et al. |
| 2018/0345600 A1 | 12/2018 | Holford et al. |
| 2019/0054697 A1 | 2/2019 | Alonso et al. |
| 2019/0176402 A1 | 6/2019 | Hofmann et al. |
| 2019/0291184 A1 | 9/2019 | Buller et al. |
| 2019/0374983 A1 | 12/2019 | Barua et al. |
| 2021/0046519 A1 | 2/2021 | Go et al. |
| 2021/0053121 A1 | 2/2021 | Go et al. |
| 2021/0060651 A1 | 3/2021 | Go et al. |
| 2021/0178675 A1* | 6/2021 | Mamrak ................ B22F 10/14 |
| 2021/0283688 A1 | 9/2021 | Fulop et al. |
| 2022/0072621 A1 | 3/2022 | Rodriguez et al. |
| 2022/0193778 A1 | 6/2022 | Borrego et al. |
| 2022/0227053 A1 | 7/2022 | Van Nieuwenhove et al. |
| 2022/0266517 A1 | 8/2022 | Noble et al. |
| 2022/0331874 A1 | 10/2022 | Diosdado Borrego et al. |
| 2023/0001606 A1 | 1/2023 | Clucas et al. |
| 2023/0150203 A1 | 5/2023 | Hutchinson et al. |

FOREIGN PATENT DOCUMENTS

| | | |
|---|---|---|
| DE | 102020106761 A1 | 1/2016 |
| DE | 102014010501 A1 | 9/2022 |
| DE | 102021124805 A | 3/2023 |
| EP | 3919193 A1 | 12/2021 |
| FR | 3114035 A1 | 3/2022 |
| WO | WO2015/143007 A2 | 9/2015 |
| WO | WO2017/075285 A1 | 5/2017 |
| WO | WO2017/198335 A1 | 11/2017 |
| WO | 2018191689 A1 | 10/2018 |
| WO | WO2020/076295 A1 | 4/2020 |
| WO | WO2022/122534 A1 | 6/2022 |
| WO | WO2023/126342 A1 | 7/2023 |

\* cited by examiner

AUTOMATED DE-POWDERING OF ADDITIVE MANUFACTURING BUILD

FIELD

The present disclosure generally pertains to additive manufacturing machines and systems, and more particularly, systems and methods for automated de-powdering of an additive manufacturing build.

BACKGROUND

Three-dimensional objects may be additively manufactured using an additive manufacturing machine. One type of additive manufacturing is binder jetting. In binder jet additive manufacturing, a liquid binder is used to join particles of a powder to form a three-dimensional object. For example, a controlled pattern of the liquid binder is applied to successive layers of the powder in a powder bed such that the layers of the material adhere to one another to form a three-dimensional green part. Through subsequent processing (e.g., sintering), the three-dimensional green part can be formed into a finished three-dimensional part.

BRIEF DESCRIPTION OF THE DRAWINGS

A full and enabling disclosure, including the best mode thereof, directed to one of ordinary skill in the art, is set forth in the specification, which makes reference to the appended figures, in which.

DETAILED DESCRIPTION

Figure 1:
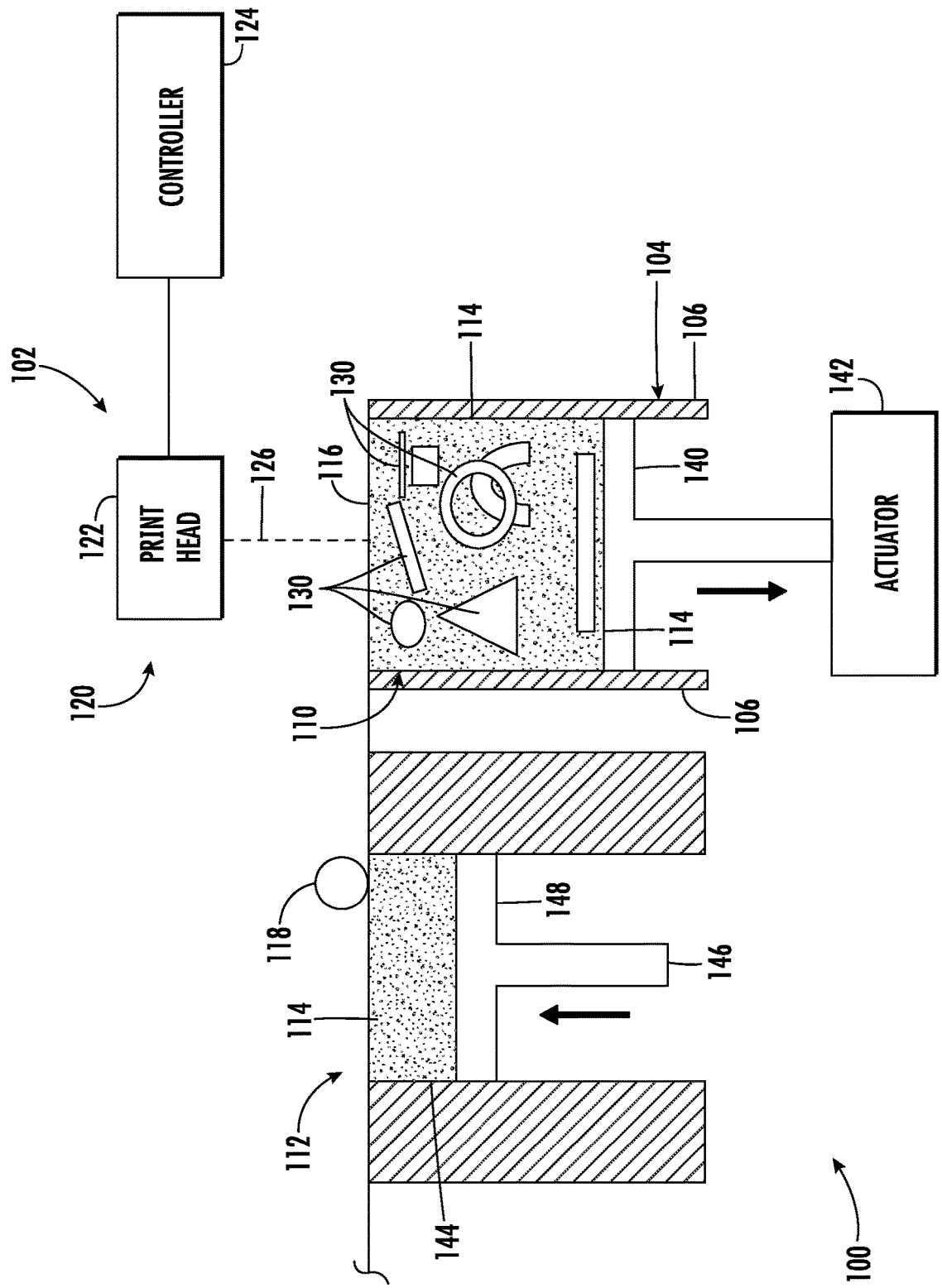
FIG. 1 schematically depicts an exemplary additive manufacturing system in accordance with an embodiment of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a," "an," and "the" include plural references unless the context clearly dictates otherwise.

The term "at least one of" in the context of, e.g., "at least one of A, B, or C" refers to only A, only B, only C, or any combination of A, B, and C.

As used herein, the terms "first," "second," and "third" may be used interchangeably to distinguish one component from another and are not intended to signify location or importance of the individual components.

The terms "coupled," "fixed," "attached to," and the like refer to both direct coupling, fixing, or attaching, as well as indirect coupling, fixing, or attaching through one or more intermediate components or features, unless otherwise specified herein.

The term "adjacent" as used herein with reference to two walls and/or surfaces refers to the two walls and/or surfaces contacting one another, or the two walls and/or surfaces being separated only by one or more nonstructural layers and the two walls and/or surfaces and the one or more nonstructural layers being in a serial contact relationship (i.e., a first wall/surface contacting the one or more non-structural layers, and the one or more nonstructural layers contacting the a second wall/surface).

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present disclosure may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, one skilled in the art will appreciate that a variety of materials and methods for bonding those materials may be used and are contemplated as within the scope of the present disclosure. As used herein, references to "fusing" may refer to any suitable process for creating a bonded layer of any of the above materials. For example, if an object is made from polymer, fusing may refer to creating a thermoset bond between polymer materials. If the object is epoxy, the bond may be formed by a crosslinking process. If the material is ceramic, the bond may be formed by a sintering process. If the material is powdered metal, the bond may be formed by a melting or sintering process. One skilled in the art will appreciate that other methods of fusing materials to make a component by additive manufacturing are possible, and the presently disclosed subject matter may be practiced with those methods.

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

An exemplary additive manufacturing process will now be described. Additive manufacturing processes fabricate components using three-dimensional (3D) information, for example a three-dimensional computer model, of the component. Accordingly, a three-dimensional design model of the component may be defined prior to manufacturing. In this regard, a model or prototype of the component may be scanned to determine the three-dimensional information of the component. As another example, a model of the component may be constructed using a suitable computer aided design (CAD) program to define the three-dimensional design model of the component.

The design model may include 3D numeric coordinates of the entire configuration of the component including both external and internal surfaces of the component. For example, the design model may define the body, the surface, and/or internal passageways such as openings, support structures, etc. In one exemplary embodiment, the three-dimensional design model is converted into a plurality of slices or segments, e.g., along a central (e.g., vertical) axis of the component or any other suitable axis. Each slice may define a thin cross section of the component for a predetermined height of the slice. The successive cross-sectional slices together form the 3D component. The component is then "built-up" slice-by-slice, or layer-by-layer, until finished.

In this manner, the components described herein may be fabricated using the additive process, or more specifically each layer is successively formed, e.g., by fusing or polymerizing a plastic using laser energy or heat or by sintering or melting metal powder. For example, a particular type of additive manufacturing process may use an energy beam, for example, an electron beam or electromagnetic radiation such as a laser beam, to sinter or melt a powder material. Any suitable laser and laser parameters may be used, including considerations with respect to power, laser beam spot size, and scanning velocity. The build material may be formed by any suitable powder or material selected for enhanced strength, durability, and useful life, particularly at high temperatures.

Each successive layer may be, for example, between about 10 µm and 200 µm, although the thickness may be selected based on any number of parameters and may be any suitable size according to alternative embodiments. Therefore, utilizing the additive formation methods described above, the components described herein may have cross sections as thin as one thickness of an associated powder layer, e.g., 10 µm, utilized during the additive formation process.

In addition, utilizing an additive process, the surface finish and features of the components may vary as needed depending on the application. For example, the surface finish may be adjusted (e.g., made smoother or rougher) by selecting appropriate laser scan parameters (e.g., laser power, scan speed, laser focal spot size, etc.) during the additive process, especially in the periphery of a cross-sectional layer which corresponds to the part surface. For example, a rougher finish may be achieved by increasing laser scan speed or decreasing the size of the melt pool formed, and a smoother finish may be achieved by decreasing laser scan speed or increasing the size of the melt pool formed. The scanning pattern and/or laser power can also be changed to change the surface finish in a selected area.

Notably, in exemplary embodiments, several features of the components described herein were previously not possible due to manufacturing constraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer sub-components and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Also, the additive manufacturing methods described above enable much more complex and intricate shapes and contours of the components described herein. For example, such components may include thin additively manufactured layers and unique fluid passageways with integral mounting features. In addition, the additive manufacturing process enables the manufacture of a single component having different materials such that different portions of the component may exhibit different performance characteristics. The successive, additive nature of the manufacturing process enables the construction of these novel features. As a result, the components described herein may exhibit improved functionality and reliability.

Unlike laser melting and laser sintering additive manufacturing techniques, which heat the material to consolidate and build layers of the material to form a printed part (e.g., metal or ceramic part), binder jetting uses a chemical binder to bond particles of the material into layers that form a green body of the printed part. As defined herein, the green body of the printed part is intended to denote a printed part that has not undergone heat treatment to remove the chemical binder. Chemical binding has been used in sand molding techniques to bond sand particles and form a sand mold that can be used to fabricate other parts. Similar to sand molding, in binder jet printing, the chemical binder is successively deposited into layers of powder to print the part. For example, the chemical binder (e.g., a polymeric adhesive) may be selectively deposited onto a powder bed in a pattern representative of a layer of the part being printed. Each printed layer may be cured (e.g., via heat, light, moisture, solvent evaporation, etc.) after printing to bond the particles of each layer together to form the green body part. After the green body part is fully formed, the chemical binder is removed during post-printing processes (e.g., debinding and sintering) to form a consolidated part. In certain post printing processes, the green body part may undergo a de-powdering process. The de-powdering process removes portions of the powder that have not been bound (e.g., adhered) by the chemical binder. However, de-powdering of the green body part is generally done before heat treating (e.g., pre-sintering) the green body part. Heat treating the green body part removes the chemical binder and builds handling strength. Therefore, during a de-powdering processes, the green body part may have insufficient handling strength and be susceptible to damage.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin. These approximating margins may apply to a single value, either or both endpoints defining numerical ranges, and/or the margin for ranges between endpoints.

The present disclosure generally provides an apparatus and technique for automated de-powdering of an additively manufactured three-dimensional object. In exemplary embodiments, the de-powdering apparatus includes one or more support assemblies that support one or more of the additively manufactured objects as the powder build material is being removed from around the additively manufactured objects. In exemplary embodiments, the additive manufacturing build with the powder build material disposed around the additively manufactured objects is moved out of the build box and into a sleeve. The one or more support assemblies are then inserted through the sleeve and into the additive manufacturing build. Actuation of one or more fluidization mechanisms, vibration mechanisms, or vacuum mechanisms are used to separate at least a portion of unbound powder build material from around the objects. Thus, the support assemblies support the objects during the powder build material removal to avoid potential damage from occurring to the objects. The unbound powder build material may be collected in the build box and potentially used for another printing process. Thus, exemplary embodiments of the present disclosure decrease the time required for de-powdering (e.g., compared to de-powdering performed manually) and can accommodate complex build orientations and objects. Embodiments of the de-powdering system enable additive manufacturing builds from one or more different additive manufacturing machines to be de-powdered by using different support assemblies specifically configured to accommodate the three-dimensional positions of the objects within the powder build material.

Referring now to FIG. 1, the presently disclosed subject matter will now be described in further detail. FIG. 1 schematically depicts an exemplary additive manufacturing system 100 according to the present disclosure. The additive manufacturing system 100 may include one or more additive manufacturing machines 102. In the illustrated embodiment, the additive manufacturing machine 102 comprises a binder jet additive manufacturing machine 102. In the illustrated embodiment, the additive manufacturing machine 102 includes a build box 104 defined by a plurality of sidewalls 106 and defining a build chamber 108 for an additive manufacturing build 110. The additive manufacturing machine 102 includes a powder source 112 configured to deposit one or more layers of a powder build material 114 onto a build surface 116 within the build box 104. For example, the powder source 112 includes a spreader or recoater 118 configured to be movable across the powder source 112 to spread one or more layers of the powder build material 114 onto the build surface 116.

In the illustrated embodiment, the additive manufacturing machine 102 includes a print system 120 including at least one print head 122 movable across the build surface 116, and a controller 124 communicatively coupled to the print head 122. The print head 122 is configured to dispense a binder 126 to the one or more layers of the powder build material 114 (e.g., on the build surface 116). The controller 124 is configured to control the movement of the print head 122 and the delivery of the binder 126 in a defined two-dimensional pattern to form one or more three-dimensional parts or objects 130 on a layer-by-layer basis.

In FIG. 1, the build box 104 also comprises a build plate 140 defining a lower boundary of the build chamber 108. The build plate 140 is vertically movable within the build box 104 by an actuator 142. In operation, the actuator 142 lowers the build plate 140 incrementally as each layer of the powder build material 114 is distributed across the build surface 116.

In the illustrated embodiment, the powder source 112 comprises a supply chamber 144 containing a supply of the powder build material 114. A piston 146 may be actuatable to elevate a supply chamber plate 148 during operation of the additive manufacturing machine 102. As the supply chamber plate 148 is elevated, a portion of the powder build material 114 is forced out of the supply chamber 144, and the recoater 118 sequentially distributes thin layers of the powder build material 114 onto the build surface 116 above the build box 104.

As described above, binder jetting uses a chemical binder to bond particles of the powder build material 114 into layers that form a green body of the printed object 130. After printing, the object 130 may undergo additional processing, by way of non-limiting example, a cure process, a heat treatment process, or other type of post-printing process to dry the powder build material 114 or chemically activate or modify the binder. A de-powdering process is also performed to remove portions of the powder build material 114 that have not been bound (e.g., adhered) by the chemical binder (e.g., generally surrounding the green body of the printed object 130). Generally, de-powdering of the green body of the printed object 130 is generally done before heat treating (e.g., pre-sintering) of the green body of the printed object 130 to create a brown body part. Heat treating the green body to create a brown body part removes the chemical binder and builds handling strength. Therefore, during a de-powdering process, the green body of the printed object 130 may have insufficient handling strength and be susceptible to damage.

Figure 2:
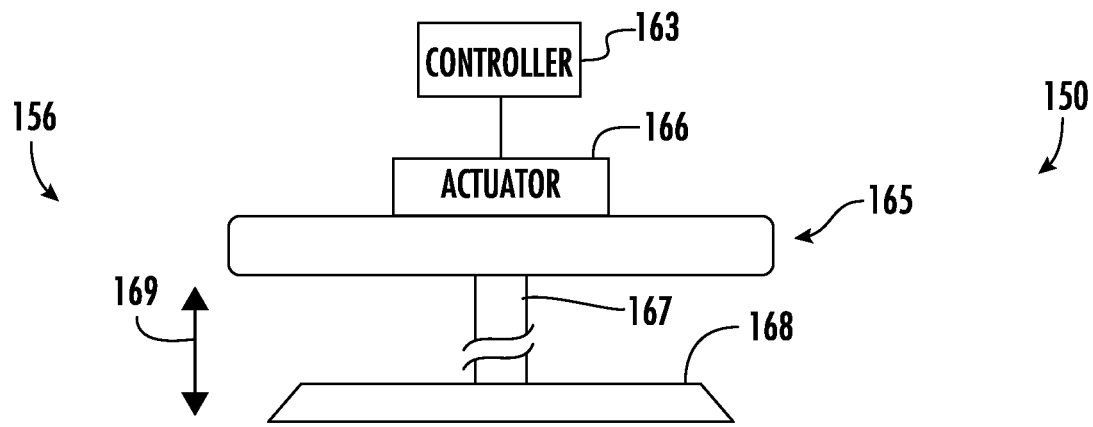
FIG. 2 schematically depicts an exemplary automated de-powdering system in accordance with embodiments of the present disclosure.
Figure 2:
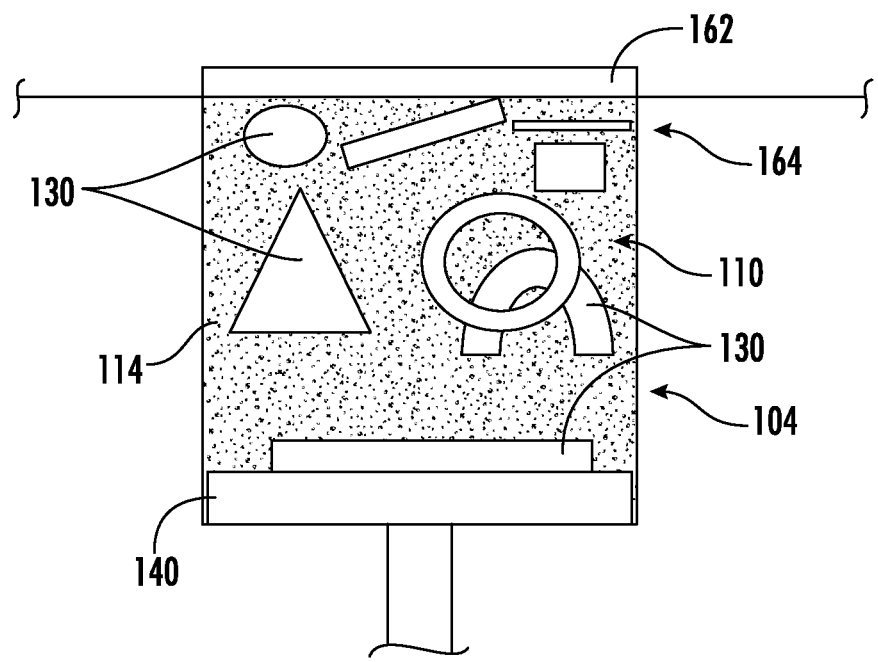

FIG. 2 is a schematic diagram illustrating an automated de-powdering system 150 according to embodiments of the present disclosure. FIG. 2 depicts a stage 156 of a de-powdering process such that the build box 104 containing the additive manufacturing build 110 is positioned within the de-powdering system 150. For example, the de-powdering system 150 is configured to receive the build box 104 with the additive manufacturing build 110 within the build box 104 from the additive manufacturing machine 102 (FIG. 1).

In the illustrated embodiment, the build box 104 also includes a cover 162 disposed proximate a top portion 164 of the build box 104 and extending over or covering the additive manufacturing build 110. In exemplary embodiments, the de-powdering system 150 includes a lift system 165 configured to lift or remove the cover 162 from the build box 104. For example, in exemplary embodiments, the lift system 165 includes an actuator 166, a shaft 167, and a gripping plate 168. The gripping plate 168 may include mechanical, vacuum-based, or other types of mechanisms configured to engage and secure the cover 162 to the gripping plate 168. The actuator 166 is actuatable to raise and lower the gripping plate 168 with respect to the build box 104 in the directions indicated by an arrow 169. In operation, actuation of the actuator 16 may cause the shaft to extend or retract in the directions indicated by the arrow 169 to enable the gripping plate 168 to engage the cover 162 and remove or lift the cover 162 away from the build box 104. It should be understood that the lift system 165 may also be actuated to replace the cover 162 onto the build box 104. Actuation of the actuator 166 and the lift system 165 may be automatically controlled, such as by a controller 163. The controller 163 may be configured similar to exemplary computing devices of the computing system 400 described below with reference to FIG. 12.

Figure 3:
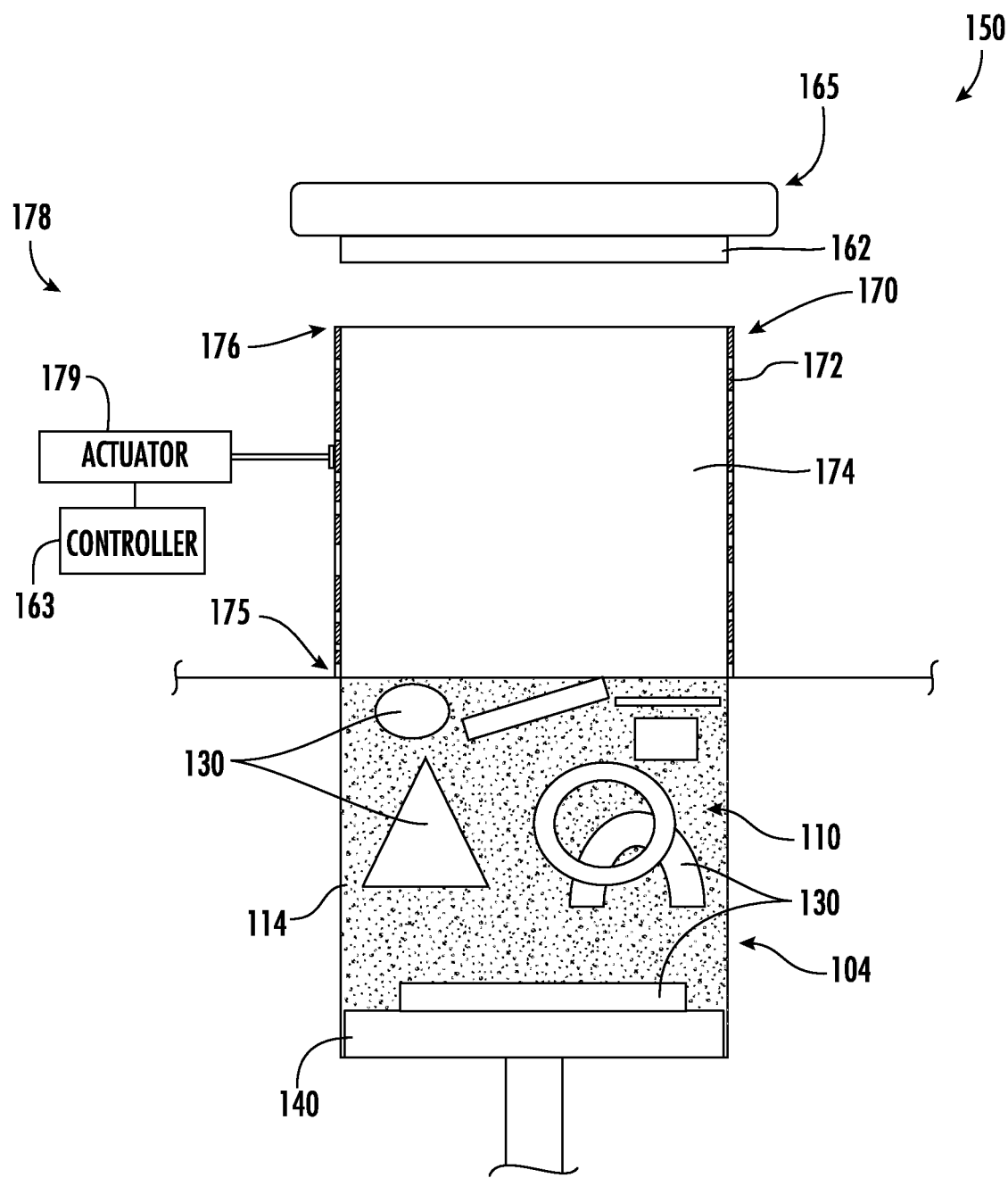
FIG. 3 schematically depicts the exemplary automated de-powdering system of FIG. 2 during a subsequent stage of a de-powdering process in accordance with embodiments of the present disclosure.

FIG. 3 is a schematic diagram illustrating the automated de-powdering system 150 of FIG. 2 according to embodiments of the present disclosure at a stage 178 of a de-powdering process subsequent to the stage 156 depicted in FIG. 2. In FIG. 3, the lift system 165 has been actuated and the cover 162 has been lifted and removed from the build box 104. In exemplary embodiments, the de-powdering system 150 also includes a sleeve 170. In exemplary embodiments, the sleeve 170 includes one or more sleeve sidewalls 172 defining a sleeve chamber 174 configured to receive the additive manufacturing build 110 within the sleeve chamber 174. For example, in exemplary embodiments, the sleeve 170 includes an open bottom portion 175 and an open top portion 176 such that the sleeve 170 is defined as a hollow structure configured having a geometry to accommodate the additive manufacturing build 110 within the sleeve chamber 174. In FIG. 3, the sleeve 170 is positioned with respect to the build box 104 such that the sleeve chamber 174 is at least partially aligned with the additive manufacturing build 110 (e.g., at least partially aligned with the build chamber 108 (FIG. 1) of the build box 104. In exemplary embodiments, the de-powdering system 150 may comprise an actuator 179 that is actuatable to move the sleeve 170 into a particular position with respect to the build box 104 to align the sleeve 170 with the additive manufacturing build 110 within the build box 104. Actuation of the actuator 179 may be automatically controlled, such as by the controller 163 or another controller configured similar to exemplary computing devices of the computing system 400 described below with reference to FIG. 12.

Figure 4:
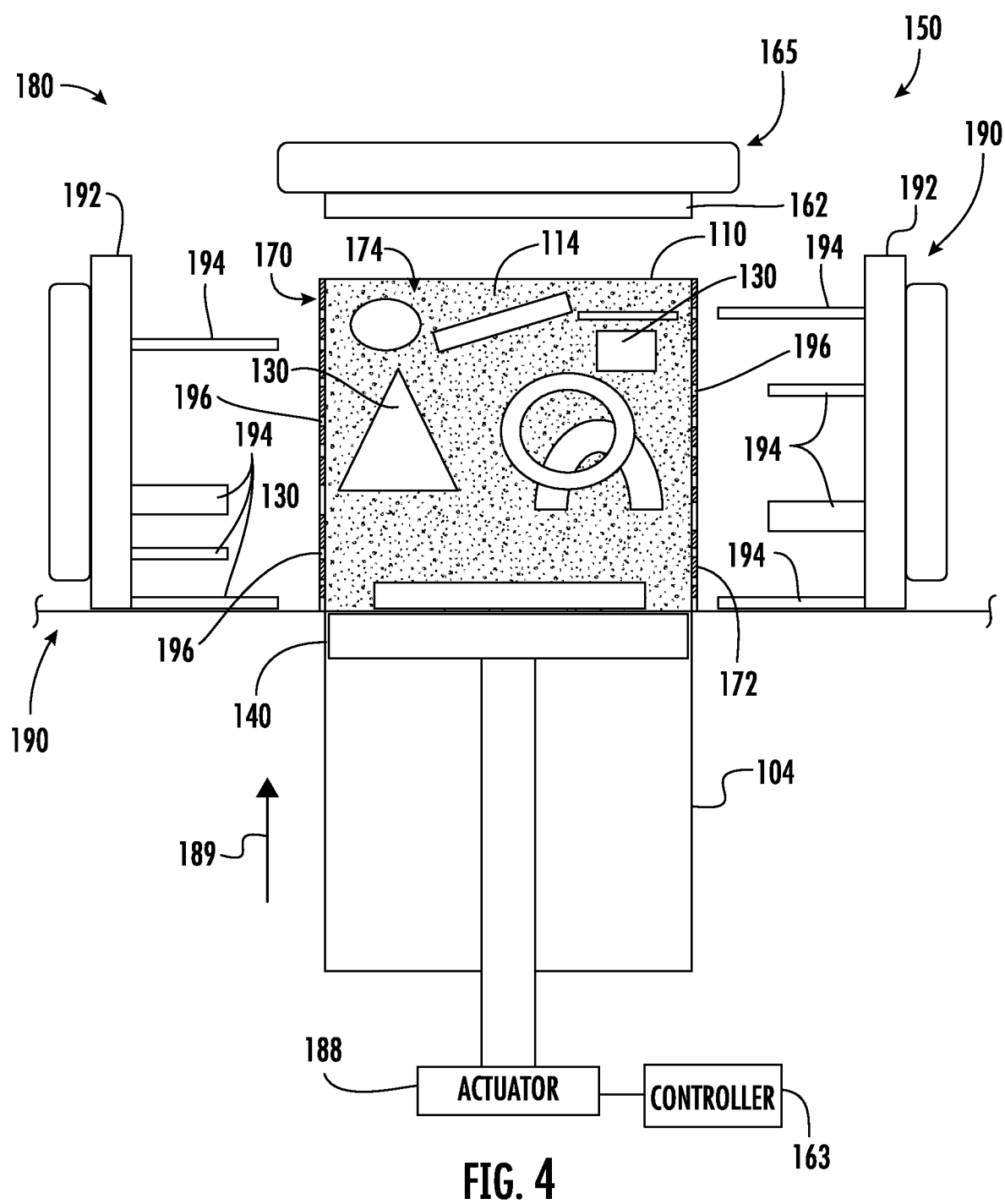
FIG. 4 schematically depicts the exemplary automated de-powdering system of FIGS. 2 and 3 during another subsequent stage of a de-powdering process in accordance with embodiments of the present disclosure.

FIG. 4 is a schematic diagram illustrating the automated de-powdering system 150 of FIGS. 2 and 3 according to embodiments of the present disclosure at a stage 180 of a de-powdering process subsequent to the stage 178 depicted in FIG. 3. In FIG. 4, an actuator 188 is engageable with the build plate 140 and actuatable to cause movement of the build plate 140 with respect to the build box 104. As depicted in FIG. 4, the sleeve 170 is positioned over or above the build box 104. Actuation of the actuator 188 causes the build plate 140 to be elevated in a direction 189 to elevate or raise the additive manufacturing build 110 with respect to the build box 104 such that at least a portion of the additive manufacturing build 110 extends into the sleeve 170 and is disposed within the sleeve chamber 174. 174. Thus, in exemplary embodiments, the sleeve 170 is configured to at least partially surround the additive manufacturing build 110 via the one or more sleeve sidewalls 172. Actuation of the actuator 188 may be automatically controlled, such as by the controller 163 or another controller configured similar to exemplary computing devices of the computing system 400 described below with reference to FIG. 12.

In exemplary embodiments, the de-powdering system 150 also includes one or more support assemblies 190. Each support assembly 190 is movable with respect to the sleeve 170 and is couplable to the sleeve. In exemplary embodiments, the support assembly 190 comprises a support plate 192 with one or more support members 194 coupled to the support plate 192. The one or more support members 194 may comprise bars, rods, plates, tubes, or any other type of support structure. Each support member 194 may be configured having a different cross-sectional geometry and length, and may be positioned with respect to the support plate 192, corresponding to locations of the one or more object 130 within the additive manufacturing build 110. For example, in exemplary embodiments, the sleeve sidewalls 172 include one or more openings 196 positioned corresponding to the one or more support members 194 such that the support members 194 may be inserted through respective openings 196 and into the additive manufacturing build 110. Accordingly, the positions of the support members 194 with respect to the support plate 192, and with respect to the sleeve 170, are selected so that the support members 194 avoid contacting the one or more objects 30 within the powder build material 114 when inserted into the additive manufacturing build 110. Thus, in exemplary embodiments, the support assembly 190 may be configured to particularly correspond to a particular additive manufacturing build 110 and the locations of the one or more objects 130 within the additive manufacturing build 110. Additionally, the sleeve 170 may be configured such that the placements of openings 196 in the sleeve sidewalls 172 accommodates multiple, different support assemblies 190 or may be specially configured to accommodate a particular support assembly 190 unique to a particular additive manufacturing build 110.

Figure 5:
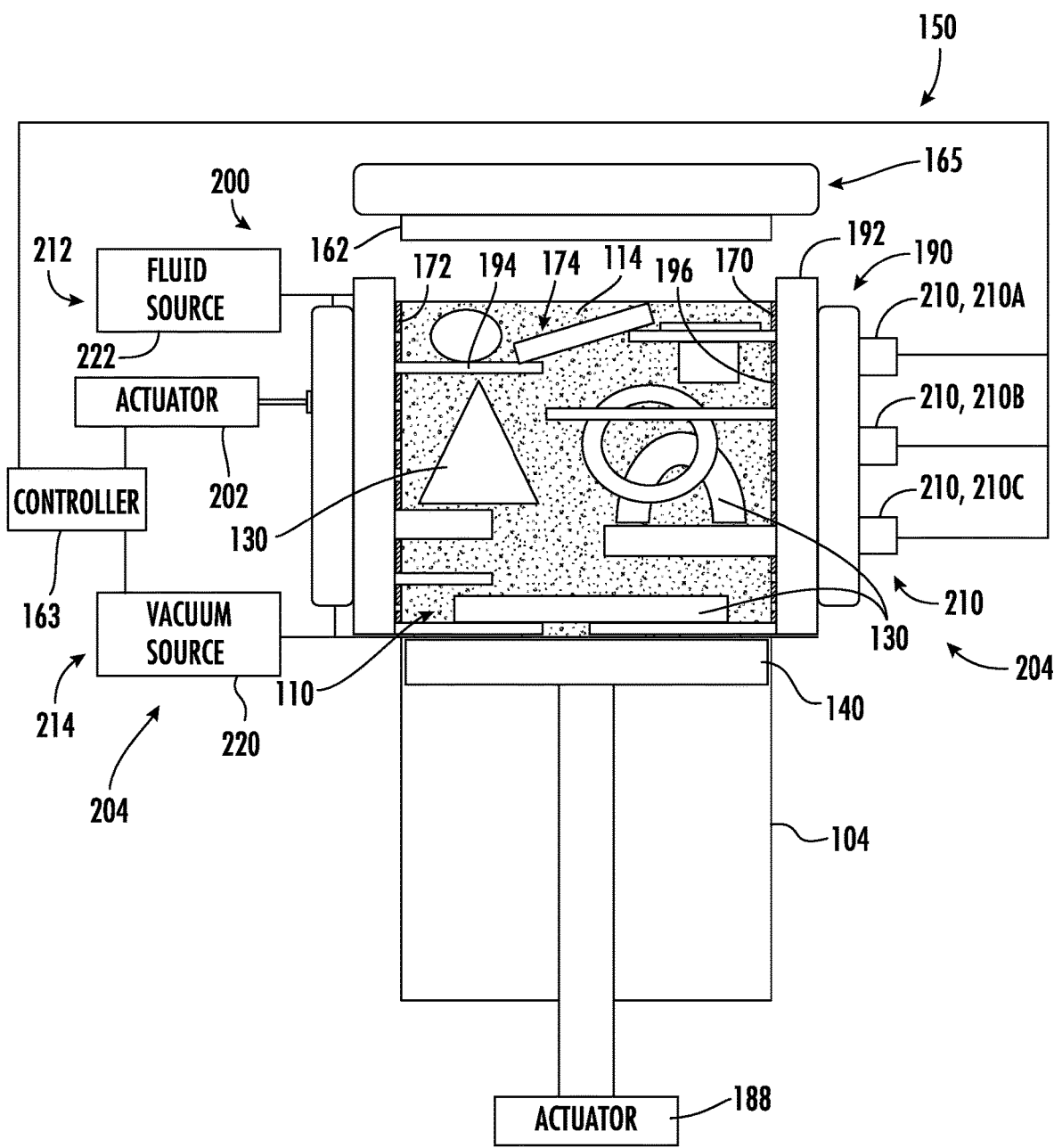
FIG. 5 schematically depicts the exemplary automated de-powdering system of FIGS. 2-4 during another subsequent stage of a de-powdering process in accordance with embodiments of the present disclosure.

FIG. 5 is a schematic diagram illustrating the automated de-powdering system 150 of FIGS. 2-4 according to embodiments of the present disclosure at a stage 200 of a de-powdering process subsequent to the stage 180 depicted in FIG. 4. In FIG. 5, the one or more support assemblies 190 are depicted in engagement with the sleeve 170 such that the respective support members 194 have been inserted into the additive manufacturing build 110. For example, in exemplary embodiments, one or more actuators 202 may be engageable with the one or more support assemblies 190 and actuatable to move the one or more support assemblies 190 into engagement with the sleeve 170 such that the one or more support members 194 extend through the respective openings 196 in the sleeve sidewalls 172 and into the additive manufacturing build 110. Actuation of the actuator 202 may be automatically controlled, such as by the controller 163 or another controller configured similar to exemplary computing devices of the computing system 400 described below with reference to FIG. 12. In exemplary embodiments, the one or more support assemblies 190 may be secured to the sleeve 170 with pins, clasps, or other joining methods or structures to secure the one or more support assemblies 190 to the sleeve 170.

In exemplary embodiments, one or more agitation mechanisms 204 are actuatable to separate at least a portion of the powder build material 114 from around the one or more objects 130. In exemplary embodiments, the one or more agitation mechanisms 204 include one or more vibration mechanisms 210, fluidization mechanisms 212, or vacuum mechanisms 214, or any combination of the foregoing, that may be coupled to at least one of the sleeve 170 or the support assemblies 190 to facilitate the separation of at least a portion of the powder build material 114 from around the one or more objects 130. For example, in exemplary embodiments, the vacuum mechanism 214 may comprise a vacuum source 220 that is fluidically couplable to the support assembly 190 and actuatable to draw a vacuum through at least a portion of the support assembly 190 to draw at least a portion of the powder build material 114 through the support assembly 190 and remove at least a portion of the powder build material 114 from within the sleeve chamber 174. In exemplary embodiments, the fluidization mechanism 212 may comprise a fluid source 222 that is actuatable to supply a fluid through at least a portion of the support assembly 190 to inject the fluid into the sleeve chamber 174 to fluidize the powder build material 114 within the sleeve chamber 174. The fluidization mechanism 212 may comprise a manifold containing flow channels, inlets, outlets, nozzles, or other types of corresponding structures to inject or distribute a fluid into the sleeve chamber 174.

The vibration mechanism 210 may include one or more mechanisms to induce vibrations into the additive manufacturing build 110. For example, by way of non-limiting example, the vibration mechanism 210 may include one or more ultrasonic transducers, pneumatic transducers, or other types of contact or non-contact vibration inducing mechanisms. In the illustrated embodiment, the vibration mechanism 210 includes three vibration mechanisms 210A, 210B, and 210C. However, it should be understood that a greater or fewer quantity of vibration mechanisms 210 may be used. Additionally, although the vibration mechanisms 210A, 210B, and 210C are depicted as being disposed on a single side of the sleeve 170, it should be understood that one or more of the vibration mechanisms 210 210A, 210B, and 210C may additionally or alternatively be disposed on other or additional sides of the sleeve 170. In exemplary embodiments, the vibration mechanisms 210A, 210B, and 210C are positioned spaced apart from each other to form one or more separately controllable vibration zones within the additive manufacturing build 110. For example, in exemplary embodiments the vibration mechanisms 210A, 210B, and 210C are individually or separately controllable such as, by way of non-limiting example, by frequency, intensity or amplitude, time of activation or deactivation, to control the vibrations induced into the additive manufacturing build 110 spatially, temporally, or both, during the de-powdering process. In exemplary embodiments, and by way of non-limiting example, one or more of the vibration mechanisms 210A, 210B, and 210C may be activated during an initial phase of the de-powdering process, and as the powder build material 114 separates from or no longer supports the one or more objects 130 within the sleeve 170, one or more parameters of the vibration mechanisms 210A, 210B, and 210C may be independently adjusted or modified, or one or more of the vibration mechanisms 210A, 210B, and 210C may be independently deactivated, to prevent potential damage from occurring to the one or more objects 130. Actuation of the one or more agitation mechanisms 204, such as the fluidization mechanism 212 and the vibration mechanisms 210, may be automatically controlled, such as by the controller 163 or another controller configured similar to exemplary computing devices of the computing system 400 described below with reference to FIG. 12.

Figure 6:
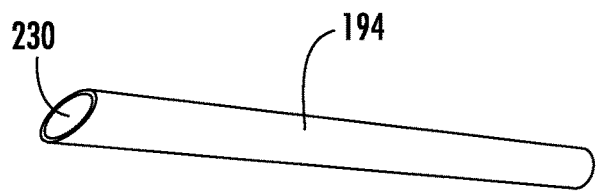
FIG. 6 schematically depicts an exemplary support member of the exemplary automated de-powdering system of FIGS. 2-5 in accordance with embodiments of the present disclosure.

FIG. 6 depicts a schematic view of an exemplary support member 194 of the support assembly 190 of FIGS. 4 and 5 in accordance with the present disclosure. In the illustrated embodiment, the support member 194 comprises a hollow support member 194 in the form or shape of a tube to define an internal flow channel 230. The flow channel 230 may be used to inject a fluid into the additive manufacturing build 110 (FIG. 5) or withdraw the powder build material 114 (FIG. 5) from the sleeve chamber 174 (FIG. 5) using the fluid source 222 (FIG. 5) or the vacuum source 220 (FIG. 5), respectively. It should be understood that the flow channel 230 may be fluidically couplable to both the fluid source 222 (FIG. 5) and the vacuum source 220 (FIG. 5) to facilitate alternately providing a fluid through, or drawing a vacuum through, the flow channel 230. It should be understood that the support member 194 may have a circular, elliptical, rectangular, or other geometry. It should also be understood that one or more of the support members 194 may be solid or provided without the flow channel 230. In the illustrated embodiment, the support member 194 comprises a substantially linear shape. However, it should be understood that one or more of the support members 194 may comprise bends, branches, or other types of configurations to facilitate localized support for certain ones of the one or more objects 130 (FIG. 5) within the sleeve chamber 174 (FIG. 5) or to facilitate fluidization, removal, or both, of the powder build material 114 (FIG. 5). Actuation of the vacuum mechanism 214, including the vacuum source 220, may be automatically controlled, such as by the controller 163 or another controller configured similar to exemplary computing devices of the computing system 400 described below with reference to FIG. 12.

Figure 7:
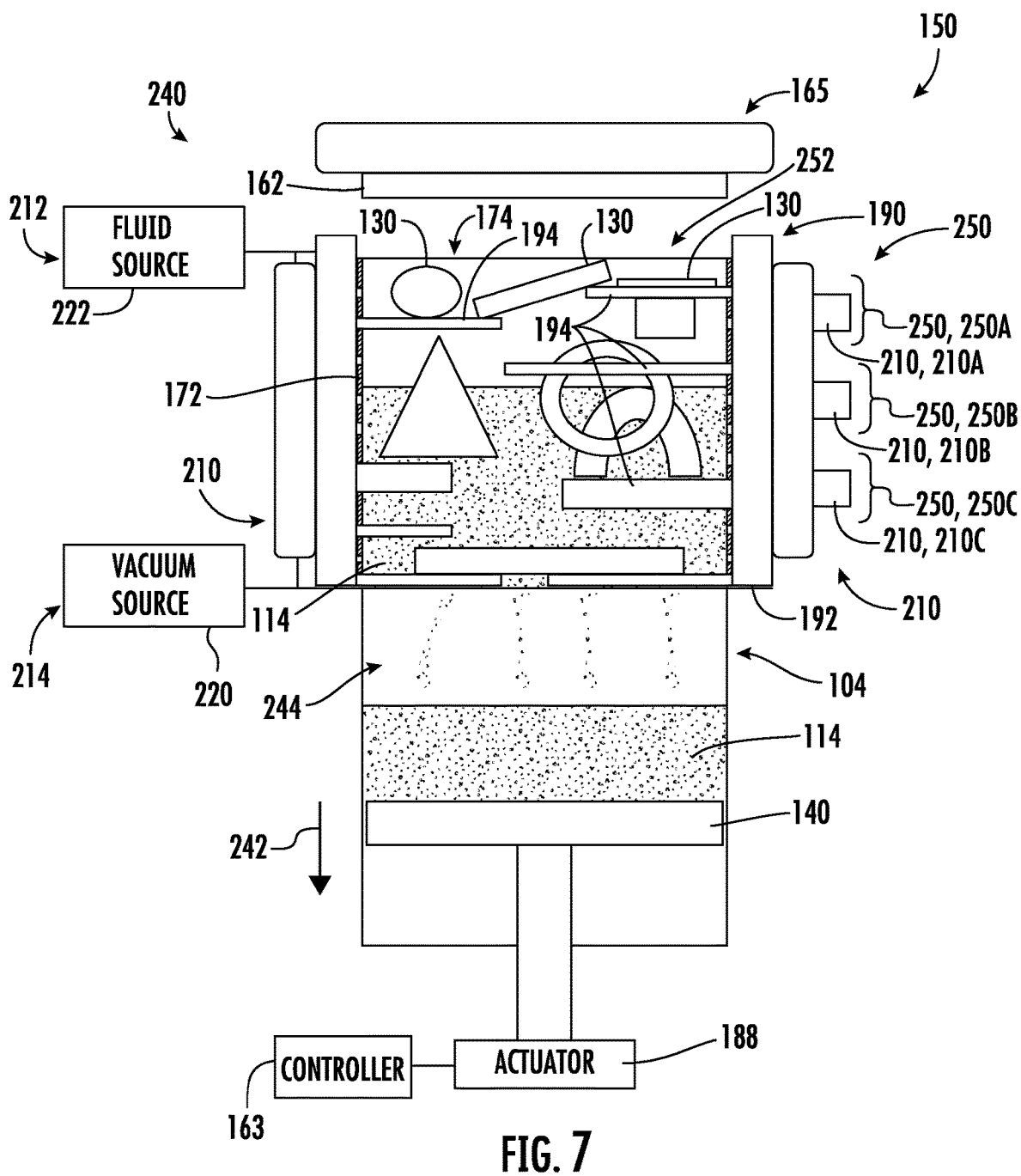
FIG. 7 schematically depicts the exemplary automated de-powdering system of FIGS. 2-6 during another subsequent stage of a de-powdering process in accordance with embodiments of the present disclosure.

FIG. 7 is a schematic diagram illustrating the automated de-powdering system 150 of FIGS. 2-6 according to embodiments of the present disclosure at a stage 240 of a de-powdering process subsequent to the stage 200 depicted in FIG. 5. In exemplary embodiments, after the insertion of the support assemblies 190 through the sleeve 170 and into the sleeve chamber 174, one or more of the of the vibration mechanisms 210, fluidization mechanisms 212, or vacuum mechanisms 214 may be actuated to fluidize, remove, or both, at least a portion of the powder build material 114 from around the one or more objects 130.

In exemplary embodiments, the actuator 188 may be actuated to lower the build plate 140, entirely or incrementally, within the build box 104 in a direction 242 such that the build box 104 forms or defines a receptacle 244 for the powder build material 114 being separated from the one or more objects 130. Actuation of the actuator 188 may be automatically controlled, such as by the controller 163 or another controller configured similar to exemplary computing devices of the computing system 400 described below with reference to FIG. 12. In exemplary embodiments, in response to one or more of the of the vibration mechanisms 210, fluidization mechanisms 212, or vacuum mechanisms 214 being actuated to fluidize, remove, or both, the powder build material 114, at least an unbound portion of the powder build material 114 falls or passes downwardly from the sleeve chamber 174 into the receptacle 244 (or the build box 104) by gravity or by fluid flow or pressure caused by the fluid source 222. Additionally, the one or more support members 194 support the one or more objects 130 within the sleeve chamber 174 in the absence of the powder build material 114 from being around or otherwise supporting the one or more object 130. Thus, in exemplary embodiments, mas the powder build material 114 is being exiting the sleeve chamber 174, the one or more objects 130 may come to rest upon one or more of the support members 194 instead of freely falling within the sleeve chamber 174.

As described above, one or more of the vibration mechanisms 210A, 210B, and 210C may be separately actuated and controlled to form one or more separately controllable vibration zones 250 within the additive manufacturing build 110. For example, in exemplary embodiments the vibration mechanisms 210A, 210B, and 210C are individually or separately controllable to form respective vibration zones 250A, 250B, and 250C. It should be understood that there may be some overlap in vibration zone 250 vibrations induced into the sleeve chamber 174 based on the proximity of vibration mechanisms 250 with respect to each other. In exemplary embodiments, and by way of non-limiting example, one or more of the vibration mechanisms 210A, 210B, and 210C may be activated during an initial phase of the de-powdering process, and as the powder build material 114 separates from or no longer supports the one or more objects 130 within the sleeve 170, one or more parameters of the vibration mechanisms 210A, 210B, and 210C may be independently adjusted or modified, or one or more of the vibration mechanisms 210A, 210B, and 210C may be independently deactivated, to prevent potential damage from occurring to the one or more objects 130. Thus, in exemplary embodiments, as depicted in FIG. 7, as the powder build material 114 begins to flow into the receptacle 244 (or build box 104), one or more of the objects 130 near an upper portion 252 of the sleeve chamber 174 may become exposed or no longer be supported by the powder build material 114. In exemplary embodiments, by way of non-limiting example, as the level of the powder build material 114 lowers within the sleeve chamber 174, a parameter of the vibration mechanism 210A may be adjusted or the vibration mechanism 210A may be deactivated to separately control vibrations within the vibration zone 250A to avoid potential damage to the one or more objects 130 near the upper portion 252 of the sleeve chamber 174. Similarly, as the level of the powder build material 114 further decreases within the sleeve chamber 174, the vibration mechanisms 210B and 210C may be similar controlled or deactivated corresponding to the respective vibration zones 250B and 250C.

Figure 8:
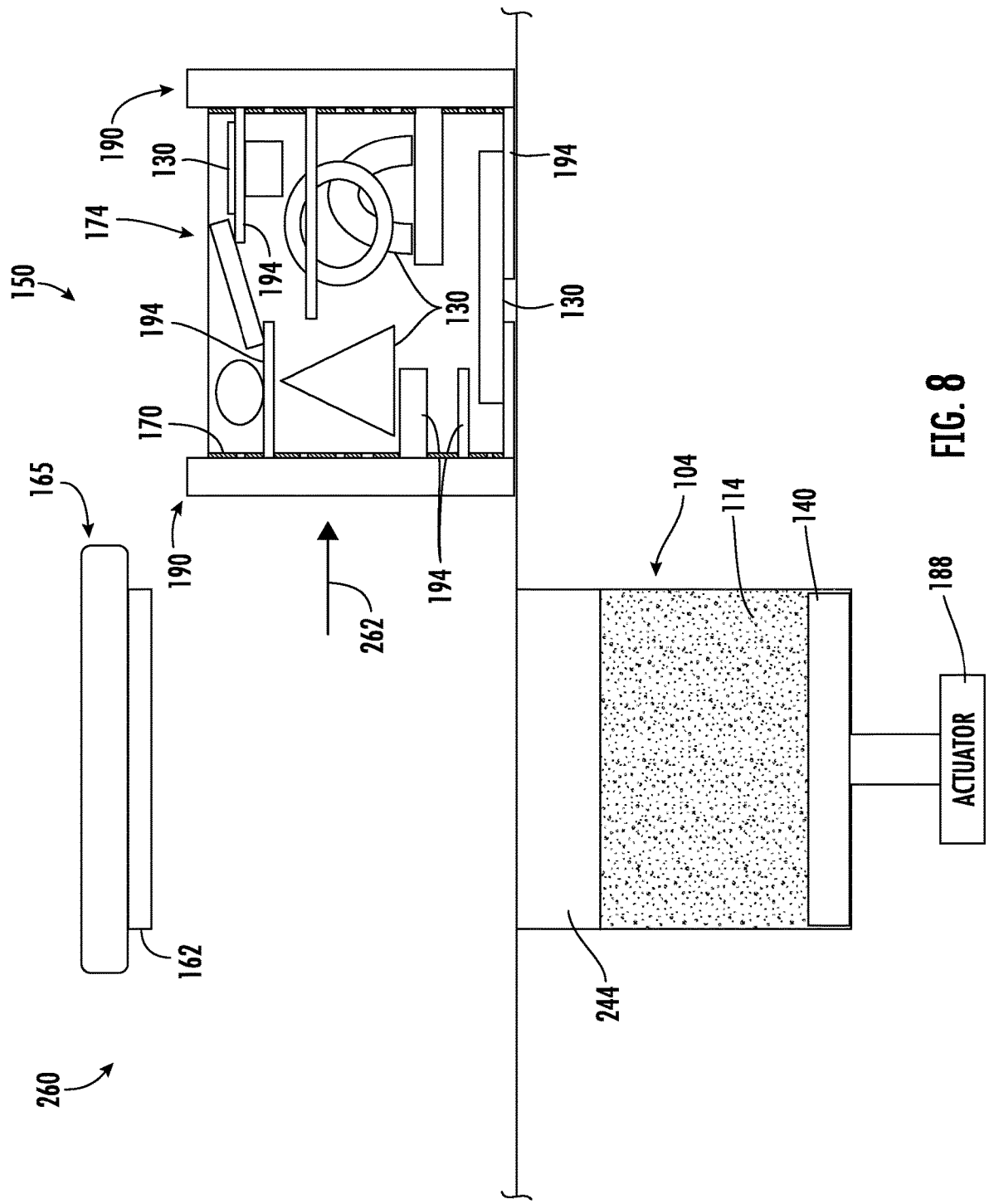
FIG. 8 schematically depicts the exemplary automated de-powdering system of FIGS. 2-7 during another subsequent stage of a de-powdering process in accordance with embodiments of the present disclosure.

FIG. 8 is a schematic diagram illustrating the automated de-powdering system 150 of FIGS. 2-7 according to embodiments of the present disclosure at a stage 260 of a de-powdering process subsequent to the stage 240 depicted in FIG. 7. In exemplary embodiments, after at least a portion of the powder build material 114 has been separated or removed from around at least some of the one or more objects 130, the sleeve 170 and the one or more support assemblies 190 may be moved together from a position above the receptacle 244 (or the build box 104), such as depicted in FIG. 7, to another position as depicted in FIG. 8 (e.g., in a direction 262) to facilitate the storage or removal of the one or more objects 130 from the sleeve 170. For example, in exemplary embodiments, the vibration mechanisms 210, fluidization mechanisms 212, or vacuum mechanisms 214, or any combination of the foregoing (as depicted in FIG. 7) may be removed or disconnected from the support assemblies 190, and the sleeve 170 and the one or more support assemblies 190 may be moved as a unit to another location to accommodate further processing of the one or more objects 130.

Figure 9:
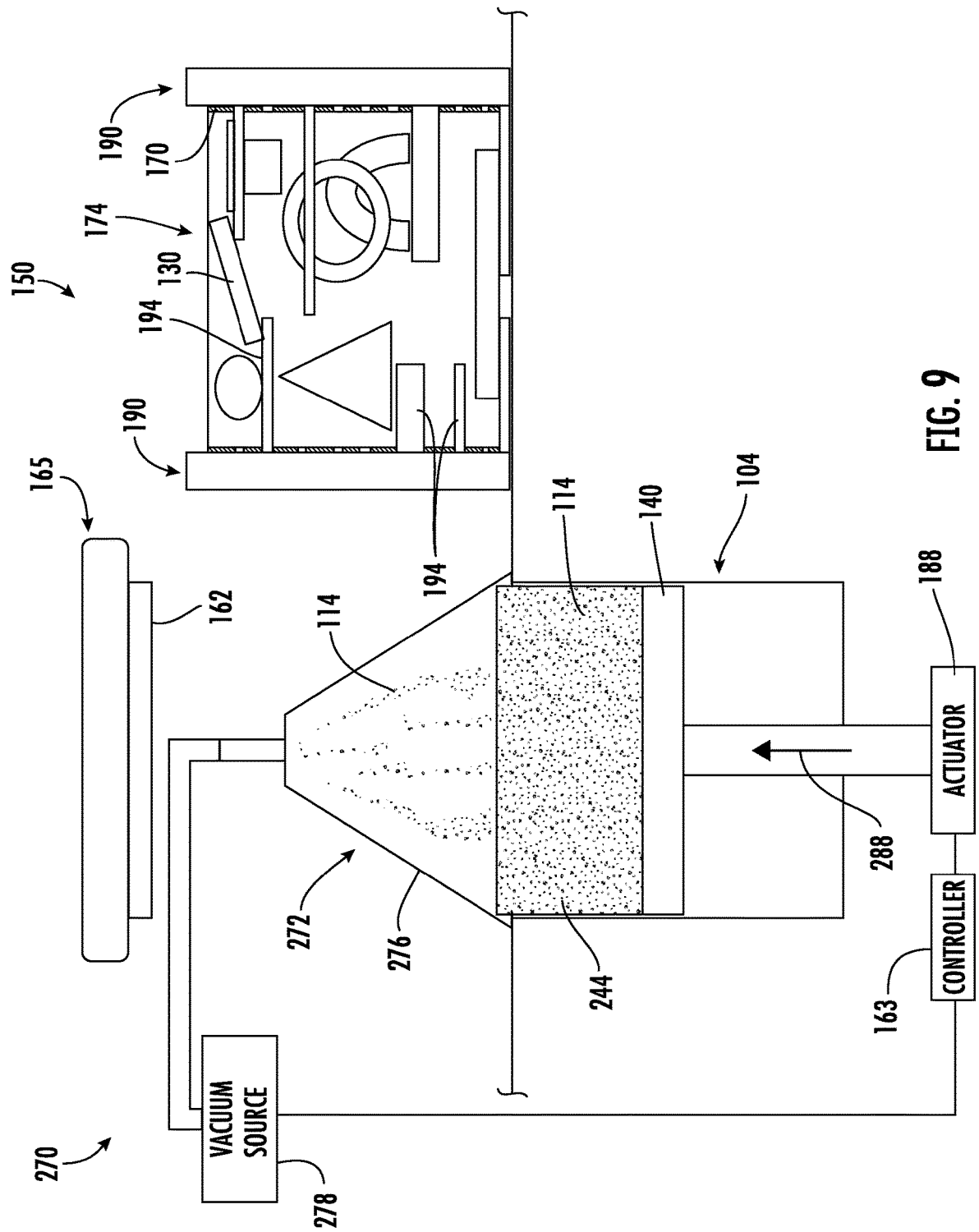
FIG. 9 schematically depicts the exemplary automated de-powdering system of FIGS. 2-8 during another subsequent stage of a de-powdering process in accordance with embodiments of the present disclosure.

FIG. 9 is a schematic diagram illustrating the automated de-powdering system 150 of FIGS. 2-8 according to embodiments of the present disclosure at a stage 270 of a de-powdering process subsequent to the stage 260 depicted in FIG. 8. In the illustrated embodiment of FIG. 9, the automated de-powdering system 150 includes an extraction assembly 272 positionable over or couplable to an upper portion 274 of the receptacle 244 (or the build box 104). In exemplary embodiments, the extraction assembly 272 may comprise a hood 276 fluidically couplable to a vacuum source 278. The vacuum source 278 is actuatable to draw a vacuum via the hood 276 to extract the powder build material 114 from the receptacle 244 (or the build box 104). In exemplary embodiments, the actuator 188 may also be actuated to raise the build plate 140 in a direction 280 within the receptacle 244 (or the build box 104) and toward the hood 276 to move the powder build material 114 toward the hood 276 to facilitate the extraction of the powder build material 114 by the 4 extraction assembly 272. Actuation and control of the extraction assembly 272, including the attachment or positioning of the hood 276, actuation of the vacuum source 278, and actuation of the actuator 188, may be automatically controlled, such as by the controller 163 or another controller configured similar to exemplary computing devices of the computing system 400 described below with reference to FIG. 12.

Figure 10:
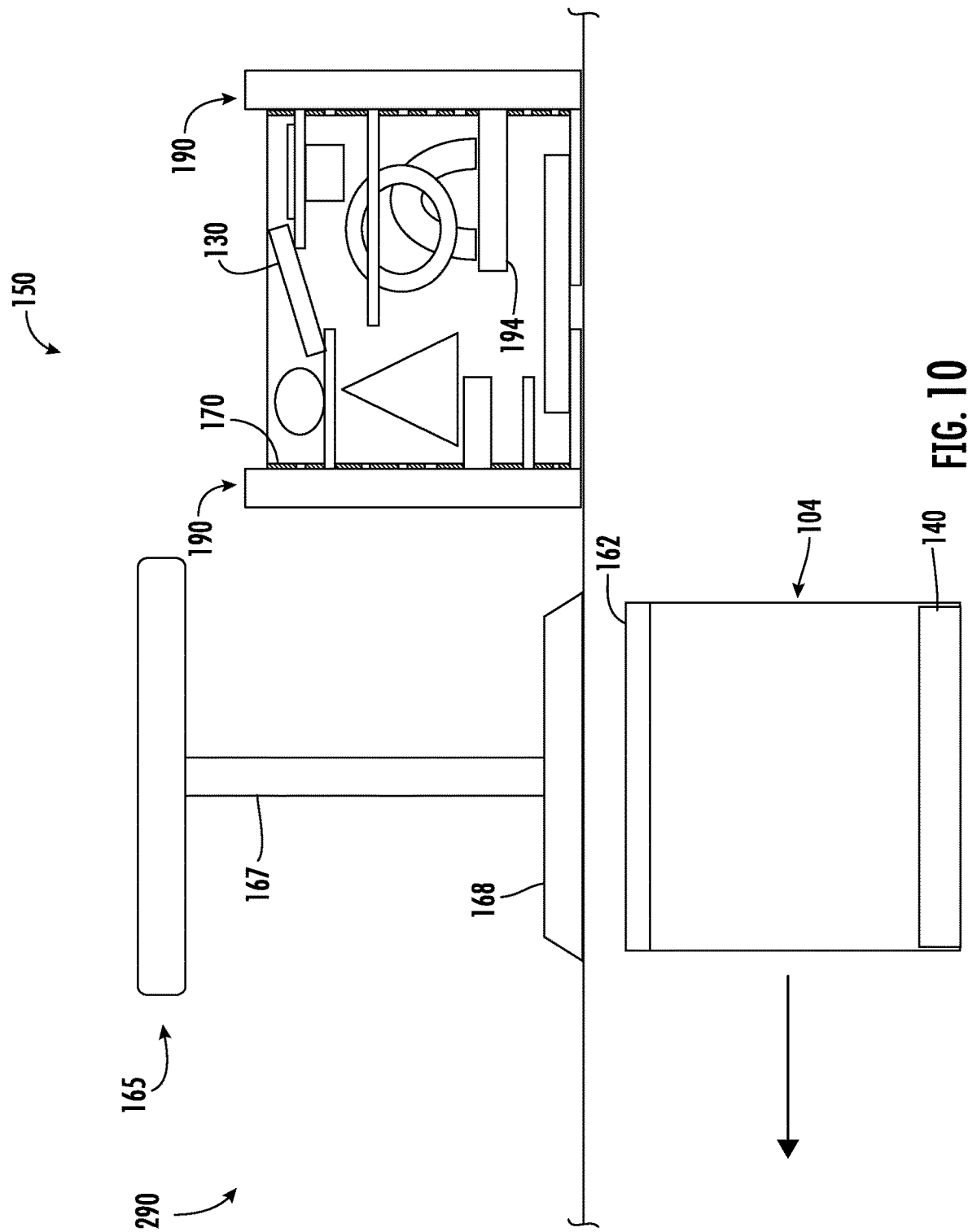
FIG. 10 schematically depicts the exemplary automated de-powdering system of FIGS. 2-9 during another subsequent stage of a de-powdering process in accordance with embodiments of the present disclosure.

FIG. 10 is a schematic diagram illustrating the automated de-powdering system 150 of FIGS. 2-9 according to embodiments of the present disclosure at a stage 290 of a de-powdering process subsequent to the stage 270 depicted in FIG. 9. In the illustrated embodiment, the lift system 165 has been actuated to replace the cover 162 onto the build box 104 (e.g., by extending the shaft 167 and the gripping plate 168) toward the build box 104. As depicted in FIG. 10, the build box 104, including the cover 162 and the build plate 140, may thereafter be moved to another location to accommodate further processing of the build box 104 or to accommodate another printing process.

Figure 11:
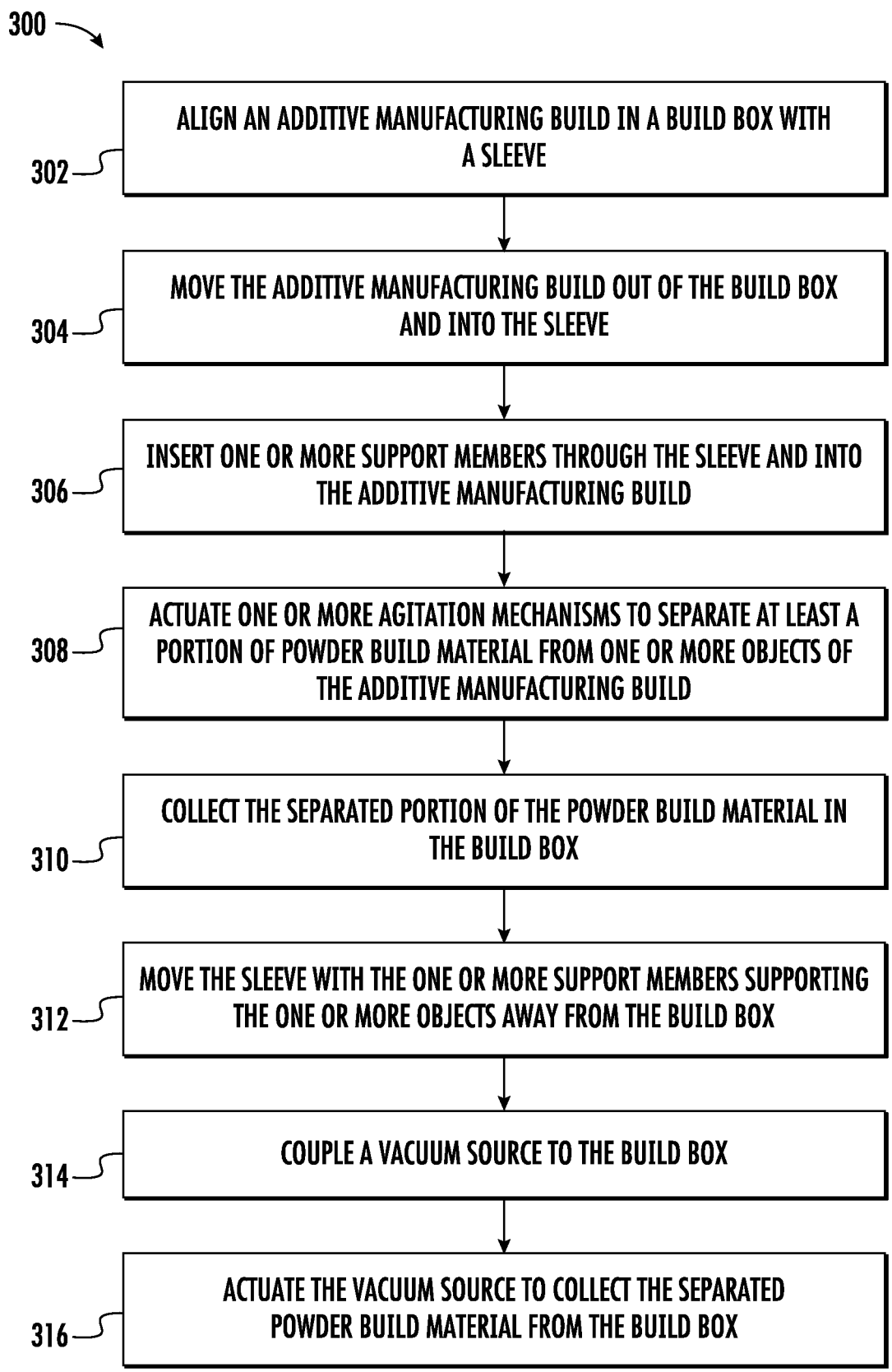
FIG. 11 depicts a method for automated de-powdering of an additive manufacturing build in accordance with an exemplary aspect of the present disclosure.

Referring to FIG. 11, a block diagram depicting an exemplary automated method 300 of de-powdering the additive manufacturing build 110 is provided. The method 300 begins at 302, where the build box 104 and the sleeve 170 are aligned with each other, or at least the additive manufacturing build 110 within the build box 104 is aligned with the sleeve 170. At 304, the build plate 140 is actuated to move the additive manufacturing build 110 out of the build box 104 and into the sleeve 170. At 306, one or more of the support assemblies 190 are brought into engagement with the sleeve 170 so that one or more support members 194 are inserted through the openings 196 in the sleeve 170 and into the additive manufacturing build 110. At 308, one or more of the agitation mechanisms 204 are actuated to separate at least a portion of the unbound powder build material 114 from the one or more objects 130 of the additive manufacturing build 110. At 310, the separated powder build material 114 falls downwardly out of the sleeve chamber 174 and is collected by the receptacle 244, such as the build box 104. At 312, the sleeve 170, along with the one or more objects 130 and the one or more support members 194 supporting the one or more objects 130 away from the build box 104. At 314, an extraction assembly 272 fluidically coupled to a vacuum source 278 is positioned or coupled to the build box 104. At 316, the vacuum source 278 is actuated to collect the powder build material 114 from the build box 104.

Figure 12:
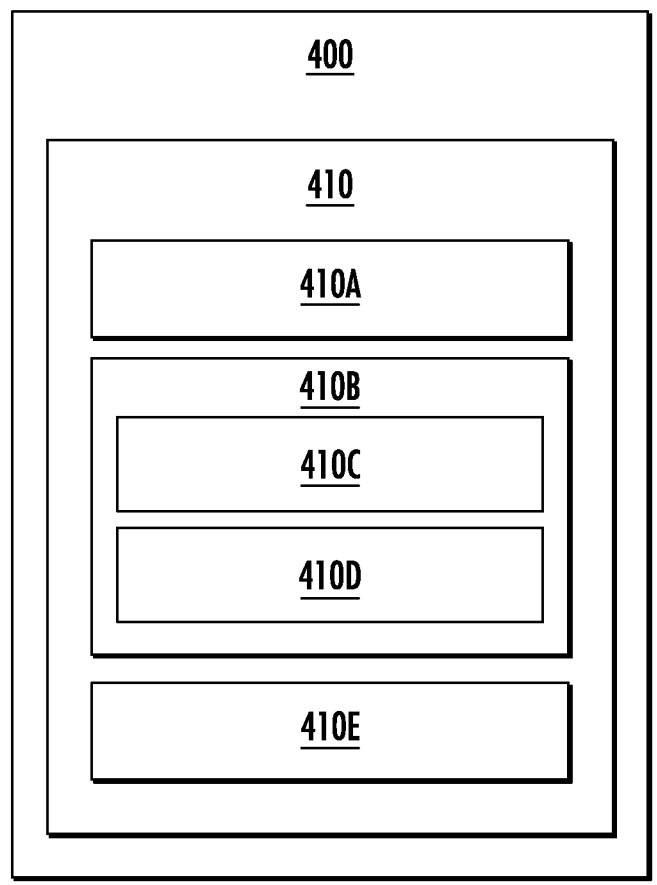
FIG. 12 is a block diagram of a computing system in accordance with various aspects of the present disclosure.

FIG. 12 is a block diagram depicting an example computing system 400 according to example embodiments of the present disclosure. The computing system 400 can be used, for example, to control various operations associated with the automated de-powdering system 150 such as, but not limited to, controlling movements or operational aspects of the build box 104 or build plate 140, controlling movements or operational aspects of the sleeve 170 and support assemblies 190, controlling movements or operational aspects of the lift system 165, controlling activation, deactivation, or operating parameters of the agitation mechanisms 204 such as vibration mechanisms 210, fluidization mechanisms 212, or vacuum mechanisms 214, and controlling the operation of one or more of the fluid sources 222 or the vacuum sources 220 and 278. The computing system 400 can include one or more computing device(s) 410. The computing device(s) 410 can include one or more processor(s) 410A and one or more memory device(s) 410B. The one or more processor(s) 410A can include any suitable processing device, such as a microprocessor, microcontroller, integrated circuit, logic device, and/or other suitable processing device. The one or more memory device(s) 410B can include one or more computer-readable media, including, but not limited to, non-transitory computer-readable media, RAM, ROM, hard drives, flash drives, and/or other memory devices.

The one or more memory device(s) 410B can store information accessible by the one or more processor(s) 410A, including computer-readable instructions 410C that can be executed by the one or more processor(s) 410A. The instructions 410C can be any set of instructions that when executed by the one or more processor(s) 410A, cause the one or more processor(s) 410A to perform operations. In some embodiments, the instructions 410C can be executed by the one or more processor(s) 410A to cause the one or more processor(s) 410A to perform operations, such as any of the operations and functions for which the computing system 400 and/or the computing device(s) 410 are configured, the operations for operating the automated de-powdering system 150, as described herein, and/or any other operations or functions of the one or more computing device(s) 410. Accordingly, the operations performed by the system 10 may be computer-implemented processes. The instructions 410C can be software written in any suitable programming language or can be implemented in hardware. Additionally, and/or alternatively, the instructions 410C can be executed in logically and/or virtually separate threads on processor(s) 410A. The memory device(s) 410B can further store data 410D that can be accessed by the processor(s) 410A. For example, the data 410D can include data indicative of frequencies or amplitudes used of the vibration mechanisms 210 for the different vibration zones 250.

The computing device(s) 410 can also include a network interface 410E used to communicate, for example, with the other components of system 400 (e.g., via a network). The network interface 410E can include any suitable components for interfacing with one or more network(s), including for example, transmitters, receivers, ports, controllers, antennas, and/or other suitable components. One or more external display devices (not depicted) can be configured to receive one or more commands from the computing device(s) 410.

Thus, the de-powdering apparatus of embodiments of the present disclosure includes one or more support assemblies that support one or more of the additively manufactured objects as the powder build material is being removed from around the additively manufactured objects. In exemplary embodiments, the additive manufacturing build with the powder build material disposed around the additively manufactured objects is moved out of the build box and into a sleeve. The one or more support assemblies are then inserted through the sleeve and into the additive manufacturing build. Actuation of one or more fluidization mechanisms, vibration mechanisms, or vacuum mechanisms are used to separate at least a portion of unbound powder build material from around the objects. Thus, the support assemblies support the objects during the powder build material removal to avoid potential damage from occurring to the objects. The unbound powder build material may be collected in the build box and potentially used for another printing process. Thus, exemplary embodiments of the present disclosure decrease the time required for de-powdering (e.g., compared to de-powdering performed manually) and can accommodate complex build orientations and objects. Embodiments of the de-powdering system enable additive manufacturing builds from one or more different additive manufacturing machines to be de-powdered by using different support assemblies specifically configured to accommodate the three-dimensional positions of the objects within the powder build material.

Further aspects of the presently disclosed subject matter are provided by the following clauses:

An automated de-powdering system, comprising: a build box including one or more sidewalls and a build plate, the one or more sidewalls and the build plate defining a build chamber configured to contain an additive manufacturing build, wherein the additive manufacturing build includes one or more objects disposed within a powder build material; a sleeve alignable with at least a portion of the build chamber; at least one actuator actuatable with respect to the build plate to move at least a portion of the additive manufacturing build out of the build box and into the sleeve; at least one support assembly couplable to the sleeve, the at least one support assembly comprising at least one support member insertable through the sleeve and into the additive manufacturing build; and at least one agitation mechanism couplable to at least one of the at least one support assembly or the sleeve, the at least one agitation mechanism actuatable to at least partially convey the powder build material away from at least one object of the one or more objects, and wherein the at least one support member is positioned within the additive manufacturing build to support the at least one object in an absence of the powder build material around the at least one object.

The automated de-powdering system of the preceding clause, wherein the at least one support member is fluidically coupled to a vacuum mechanism, wherein the vacuum mechanism is actuatable to draw at least a portion of the powder build material through the at least one support member.

The automated de-powdering system of any preceding clause, wherein the at least one agitation mechanism includes at least a first vibration mechanism and a second vibration mechanism, the first and second vibration mechanisms positioned with respect to each other to form respective first and second independently controllable first and second vibration zones.

The automated de-powdering system of any preceding clause, wherein the at least one actuator is actuatable to lower the build plate with respect to the build box during actuation of the at least one agitation mechanism.

The automated de-powdering system of any preceding clause, wherein the at least one agitation mechanism comprises at least one fluid source couplable to the at least one support assembly, the at least one fluid source actuatable to inject a fluid into the additive manufacturing build.

The automated de-powdering system of any preceding clause, further comprising an extraction assembly positionable over the build box, the extraction assembly fluidically coupled to at least one vacuum source, the at least one vacuum source actuatable to extract the powder build material from the build box.

The automated de-powdering system of any preceding clause, wherein the at least one actuator is actuatable to raise the build plate with respect to the build box during actuation of the at least one vacuum source.

The automated de-powdering system of any preceding clause, wherein the at least one actuator is actuatable to move the sleeve, with the at least one support assembly coupled to the sleeve and the at least one object within the sleeve, away from the build box.

The automated de-powdering system of any preceding clause, wherein the at least one agitation mechanism comprises at least one of a vibration mechanism, a fluidization mechanism, or a vacuum mechanism.

An automated de-powdering method, comprising: positioning a sleeve with respect to a build box to align the sleeve with at least a portion of an additive manufacturing build disposed within the build box, wherein the additive manufacturing build includes one or more objects disposed within a powder build material; moving a build plate of the build box, via at least one actuator, to move at least a portion of the additive manufacturing build out of the build box and into the sleeve; coupling at least one support assembly to the sleeve, the at least one support assembly including at least one support member extending through the sleeve and into the additive manufacturing build; and actuating at least one agitation mechanism to at least partially convey the powder build material away from at least one object of the one or more objects, and wherein the at least one support member is positioned within the additive manufacturing build to support the at least one object in an absence of the powder build material around the at least one object.

The automated de-powdering method of any preceding clause, wherein the at least one support member is fluidically coupled to a vacuum mechanism, and further comprising actuating the vacuum mechanism to draw at least a portion of the powder build material through the at least one support member.

The automated de-powdering method of any preceding clause, wherein the at least one agitation mechanism includes at least a first vibration mechanism and a second vibration mechanism, and wherein actuating the at least one agitation mechanism comprises independently controlling the first and second vibration mechanisms to form respective first and second vibration zones.

The automated de-powdering method of any preceding clause, further comprising actuating the at least one actuator to lower the build plate with respect to the build box during actuation of the at least one agitation mechanism.

The automated de-powdering method of any preceding clause, wherein the at least one agitation mechanism comprises at least one fluid source couplable to the at least one support assembly, and wherein actuating the at least one agitation mechanism comprises actuating the at least one fluid source to inject a fluid into the additive manufacturing build.

The automated de-powdering method of any preceding clause, further comprising: actuating the at least one actuator to move the sleeve, with the at least one support assembly coupled to the sleeve and the at least one object within the sleeve, away from the build box; positioning an extraction assembly over the build box, the extraction assembly fluidically coupled to at least one vacuum source; actuating the at least one actuator to raise the build plate with respect to the build box; and actuating the at least one vacuum source to extract the powder build material from the build box.

The automated de-powdering method of any preceding clause, further comprising, automatically controlling, via a controller, at least one of the positioning of the sleeve, the moving of the build plate, the coupling of the at least one support assembly to the sleeve, or the actuating of the at least one agitation mechanism.

An automated de-powdering system, comprising: a sleeve comprising one or more sleeve sidewalls, at least one of the one or more sleeve sidewalls comprising at least one opening, and wherein the one or more sleeve sidewalls form a sleeve chamber defined to receive an additive manufacturing build within the sleeve chamber, wherein the additive manufacturing build includes one or more objects disposed within a powder build material; at least one support assembly couplable to the sleeve, the at least one support assembly comprising at least one support member insertable through the at least one opening and into the additive manufacturing build; a receptable positionable beneath the sleeve; and at least one agitation mechanism couplable to at least one of the at least one support assembly or the sleeve, the at least one agitation mechanism actuatable to at least partially convey the powder build material away from at least one object of the one or more objects and into the receptacle, and wherein the at least one support member is positioned within the additive manufacturing build to support the at least one object in an absence of the powder build material around the at least one object.

The automated de-powdering system of any preceding clause, wherein the at least one agitation mechanism comprises at least one vibration mechanism, the at least one vibration mechanism including at least a first vibration mechanism and a second vibration mechanism, the first and second vibration mechanisms positioned with respect to each other to form respective first and second independently controllable first and second vibration zones.

The automated de-powdering system of any preceding clause, wherein the at least one agitation mechanism comprises at least one vacuum mechanism, wherein the at least one support member comprises a fluid passageway fluidically coupled to the at least one vacuum mechanism, and wherein the at least one vacuum mechanism is actuatable to draw at least a portion of the powder build material through the fluid passageway.

The automated de-powdering system of any preceding clause, further comprising at least one actuator actuatable to move the sleeve, with the at least one support assembly coupled to the sleeve and the at least one object within the sleeve, away from the receptacle.

The automated de-powdering system of any preceding clause, wherein the at least one agitation mechanism comprises at least one fluidization mechanism, the at least one fluidization mechanism comprising at least one fluid source couplable to the at least one support assembly, the at least one fluid source actuatable to inject a fluid into the additive manufacturing build.

The automated de-powdering system of any preceding clause, further comprising an extraction assembly positionable over the receptacle, the extraction assembly fluidically coupled to at least one vacuum source, the at least one vacuum source actuatable to extract the powder build material from the receptacle.

This written description uses examples to describe the presently disclosed subject matter, including the best mode, and also to enable any person skilled in the art to practice such subject matter, including making and using any devices or systems and performing any incorporated methods. The patentable scope of the presently disclosed subject matter is defined by the claims, and may include other examples that occur to those skilled in the art. The scope of the claims encompasses such other examples that include structural elements that do not differ from the literal language of the claims or that have insubstantial differences from the literal languages of the claims.

What is claimed is:

1. An automated de-powdering system, comprising:
   a build box including one or more sidewalls and a build plate, the one or more sidewalls and the build plate defining a build chamber configured to contain an additive manufacturing build, wherein the additive manufacturing build includes one or more objects disposed within a powder build material;
   a sleeve alignable with at least a portion of the build chamber;
   at least one actuator actuatable with respect to the build plate to move at least a portion of the additive manufacturing build out of the build box and into the sleeve;
   at least one support assembly couplable to the sleeve, the at least one support assembly comprising at least one support member insertable through the sleeve and into the additive manufacturing build; and
   at least one agitation mechanism couplable to at least one of the at least one support assembly or the sleeve, the at least one agitation mechanism actuatable to at least partially convey the powder build material away from at least one object of the one or more objects, and wherein the at least one support member is positioned within the additive manufacturing build to support the at least one object in an absence of the powder build material around the at least one object, wherein the at least one actuator is actuatable to move the sleeve, with the at least one support assembly coupled to the sleeve and the at least one object within the sleeve, away from the build box.

2. The automated de-powdering system of claim 1, wherein the at least one support member is fluidically coupled to a vacuum mechanism, wherein the vacuum mechanism is actuatable to draw at least a portion of the powder build material through the at least one support member.

3. The automated de-powdering system of claim 1, wherein the at least one agitation mechanism includes at least a first vibration mechanism and a second vibration mechanism, the first and second vibration mechanisms positioned with respect to each other to form respective first and second independently controllable first and second vibration zones.

4. The automated de-powdering system of claim 1, wherein the at least one actuator is actuatable to lower the build plate with respect to the build box during actuation of the at least one agitation mechanism.

5. The automated de-powdering system of claim 1, wherein the at least one agitation mechanism comprises at least one fluid source fluidically couplable to the at least one support assembly, the at least one fluid source actuatable to inject a fluid into the additive manufacturing build.

6. The automated de-powdering system of claim 1, further comprising an extraction assembly positionable over the build box, the extraction assembly fluidically coupled to at least one vacuum source, the at least one vacuum source actuatable to extract the powder build material from the build box.

7. The automated de-powdering system of claim 6, wherein the at least one actuator is actuatable to raise the build plate with respect to the build box during actuation of the at least one vacuum source.

8. The automated de-powdering system of claim 1, wherein the at least one agitation mechanism comprises at least one of a vibration mechanism, a fluidization mechanism, or a vacuum mechanism.

* * * * *